Patented Sept. 10, 1940

2,214,477

UNITED STATES PATENT OFFICE 2,214,477

MANUFACTURE OF PHTHALOCYANINES

Albert Riley, Huddersfield, England, assignor to Imperial Chemical Industries Limited, a corporation of Great Britain No Drawing. Application June 3, 1937, Serial No. 146,313. In Great Britain June 4, 1936

8 Claims. (Cl. 260—314)

This invention is of an improved process for making stable metal phthalocyanines. The process is to be regarded as an improvement of that described in the specification of co-pending application of Max Wyler, Serial No. 90,008, filed July 10, 1936.

By the present invention there is obtained an improved yield, or as a further or alternative technical advantage, the reaction is caused to take place smoothly at a lower temperature, and as a consequence the shade of the resulting pigment is brighter.

In application Serial No. 90,008 it was shown that certain metal phthalocyanines, for instance, those of copper, iron, nickel, cobalt, chromium, and aluminium can be made from diammonium phthalate, phthalic anhydride, phthalamide, phthalimide, and other related substances (in which also are included nuclear substitution derivatives), when the reaction thereof with the requisite metal-yielding substance is effected in a medium of urea, with or without pressure. Insofar as the organic initial material is concerned, the said copending application mentions the following as suitable: A phthalic anhydride (the term includes also the anhydrides of naphthalene-1:2- and -2:3-dicarboxylic acids) or the corresponding free acid, or a mono ether, e. g. an alkyl ether thereof, or an ammonium salt thereof, or a mono or di-amide, or imide of the said acid, or an ortho-cyano-benzoic acid or an ammonium salt or ester thereof. It also suggests the use of a phthalimimide as typified by phthalimimide itself (also known as imino-phthalimidine). It was further shown in that application that the reaction was facilitated, in that the yield and quality of the product were improved or the reaction caused to take place at a lower temperature, if boric acid were present in the melt.

I have now found that boric acid is not unique, but that other substances, which with boric acid, may be termed ancillary reagents, may be used, and that within this wide class there are substances of outstandingly useful properties.

According to my invention ancillary reagents are brought into the reacting mixture of a phthalic anhydride or other phthalic derivative, urea, and a metal-yielding substance, these ancillary re-agents being substances consisting of or containing elements of the groups V and VI of the periodic system according to Mendeleeff and having atomic numbers between 15 and 92 inclusive.

These ancillary reagents are used in relatively small amounts. The precise mechanism of their behaviour has not been determined. They may have a catalytic function. Be that as it may, my invention is based on my discovery that a common behaviour is shown by the substances I have classed together as ancillary agents, although they vary in degree of activity.

The amount of ancillary agent is, as indicated, relatively small; it may be from 0.1 to 5% of the weight of the entire mass of reagents. Combinations of ancillary agents may be used.

The ancillary agents vary, as has been said, in their efficiency. Thus, with ammonium molybdate a good yield of copper octa (3:6)-chlorophthalocyanine is obtained from 3:6-dichlorophthalic anhydride and urea, whereas with ammonium phosphate a smaller yield is obtained. Nevertheless, as when neither ammonium molybdate nor ammonium phosphate is present a still smaller yield is obtained, it is seen that ammonium phosphate is a useful ancillary agent.

The invention is illustrated but not limited by the following examples, in which the parts are by weight.

Example 1

120 parts of urea are melted in an enamelled iron vessel provided with a stirrer and when the temperature is 160–165° C. 100 parts of phthalic anhydride are stirred in. 0.2 part of ammonium molybdate are added, followed by 25 parts of anhydrous cupric chloride, which is slowly added. The temperature rises by heat of reaction and copper phthalocyanine begins to be formed. There is some development of froth. The mixture is kept at 170° C. until the froth subsides and it is then heated at 190° C. for two hours, at the end of which time it is too stiff to be stirred. It is cooled, powdered, and boiled first with dilute aqueous caustic soda, then with boiling dilute aqueous hydrochloric acid. Finally it is washed with water and dried. 81 parts of copper phthalocyanine are thus obtained.

A similar good yield of copper octa (3:6)-chlorophthalocyanine is obtained when 3:6-dichloro-phthalic anhydride is used instead of phthalic anhydride itself.

Instead of 0.2 part of ammonium molybdate there may be used to similar effect 1.6 parts of diammonium hydrogen phosphate, or 4 parts of tartar emetic, or 2.2 parts of tungstic acid. Ammonium molybdate, for instance, may be used to advantage in conjunction with boric acid, or a compound of two active elements, e. g. ammonium borotungstate or ammonium phosphomolybdate or phospho-tungsto-molybdic acid may be used.

Example 2

150 parts of urea are melted as described in the preceding example and 150 parts of phthalic anhydride are added. Then 22.5 parts of cupric chloride and 1.85 parts of arsenious oxide are added at 160–180° C. Even at this temperature copper phthalocyanine is rapidly formed. The melt is heated for two hours at 170–180° C. It is then cooled and treated as in Example 1. The yield of copper phthalocyanine is 63 parts.

Other ancillary agents which I find to merit specific mention are bismuth sulphate, ammonium vanadate, selenium, sodium and potassium molybdates, potassium thiomolybdate, and molybdenum trioxide. It has been explained that I have found that there is some variation in the activity of the various ancillary agents and that this variation appears to be dependent on the nature of the active element and not to be a function of the quantity used. I have indeed found that compounds of molybdenum are to be preferred by reason of their great activity. In the claims below the phrase "a catalytic quantity" shall be understood as referring to a quantity not exceeding 5% by weight of the entire reaction mass.

Instead of phthalic anhydride, phthalonitrile, or o-cyanobenzoic acid or its mono-esters or other derivatives may be used.

I claim:

1. The process of producing a metal-phthalocyanine coloring matter which comprises heating together urea, a metalliferous reagent capable of supplying a metal selected from the group consisting of iron, nickel, cobalt, aluminum, chromium and copper, and an ortho-arylene derivative selected from the group consisting of ortho-arylene anhydrides, the corresponding free acids, ammonium salts of said acids, mono-amides of said acids, diamides of said acids, the imides and imimides of said acids, the ortho-arylene-cyano-carboxylic acids, and ammonium salts of the latter, the reaction being effected in the presence of a catalytic quantity of an ancillary reagent containing an element selected from the group consisting of phosphorus, vanadium, arsenic, selenium, antimony, molybdenum, tungsten and bismuth.

2. A process as in claim 1, the reaction being carried out in the further presence of boric acid.

3. The process of producing a copper-phthalocyanine coloring matter, which comprises heating together urea, a copper-yielding reagent, and an ortho-arylene derivative selected from the group consisting of ortho-arylene anhydrides, the corresponding free acids, ammonium salts of said acids, monoamides of said acids, diamides of said acids, the imides and imimides of said acids, the ortho-arylene-cyano-carboxylic acids, and ammonium salts of the latter, the reaction being carried out in the presence of a catalytic quantity of an ancillary reagent containing an element selected from the group consisting of phosphorus, vanadium, arsenic, selenium, antimony, molybdenum, tungsten and bismuth.

4. The process of producing a copper-phthalocyanine coloring matter, which comprises heating together urea, a copper-yielding reagent, and an ortho-arylene derivative selected from the group consisting of ortho-arylene anhydrides, the corresponding free acids, ammonium salts of said acids, monoamides of said acids, diamides of said acids, the imides and imimides of said acids, the ortho-arylene-cyano-carboxylic acids, and ammonium salts of the latter, the reaction being carried out in the presence of a catalytic quantity of a substance containing molybdenum.

5. A process as in claim 4, the reaction being carried out in the further presence of boric acid.

6. In the process of producing a copper-phthalocyanine by heating together an ortho-phthalic anhydride, a reagent yielding copper, and urea, the improvement which comprises effecting the reaction in the presence of a catalytic quantity of a molybdate.

7. In the process of producing a copper-phthalocyanine by heating together an ortho-phthalic anhydride, a reagent yielding copper, and urea, the improvement which comprises effecting the reaction in the presence of a catalytic quantity of a molybdate and in the further presence of boric acid.

8. The process of producing copper-phthalocyanine, which comprises heating together, at a temperature between 160 and 190° C., substantially 100 parts of phthalic anhydride, 25 parts of cupric chloride, 120 parts of urea and 0.2 part of ammonium molybdate, and recovering the resulting pigment.

ALBERT RILEY.